(12) United States Patent
Yanai

(10) Patent No.: US 10,108,257 B2
(45) Date of Patent: Oct. 23, 2018

(54) ELECTRONIC DEVICE, CONTROL METHOD THEREOF, AND STORAGE MEDIUM

(71) Applicant: CANON KABUSHIKI KAISHA, Tokyo (JP)

(72) Inventor: Shotaro Yanai, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 190 days.

(21) Appl. No.: 15/151,920

(22) Filed: May 11, 2016

(65) Prior Publication Data

US 2016/0334867 A1    Nov. 17, 2016

(30) Foreign Application Priority Data

May 13, 2015  (JP) ................................ 2015-098487

(51) Int. Cl.
*G06F 3/01*    (2006.01)
*G06F 3/044*   (2006.01)
*G06F 3/00*    (2006.01)

(52) U.S. Cl.
CPC .............. *G06F 3/011* (2013.01); *G06F 3/005* (2013.01); *G06F 3/044* (2013.01)

(58) Field of Classification Search
CPC ........... G06F 3/005; G06F 3/011; G06F 3/044
USPC ................................................. 345/173–174
See application file for complete search history.

(56) References Cited

U.S. PATENT DOCUMENTS

| | | | |
|---|---|---|---|
| 2006/0170660 A1* | 8/2006 | Miyata | G06F 3/03547 345/173 |
| 2012/0056830 A1* | 3/2012 | Suzuki | G06F 1/1626 345/173 |
| 2012/0127107 A1* | 5/2012 | Miyashita | G06F 3/04883 345/173 |
| 2014/0300559 A1* | 10/2014 | Tanimoto | G06F 3/0416 345/173 |
| 2014/0340321 A1* | 11/2014 | Chang | G06F 3/0418 345/173 |
| 2015/0145788 A1* | 5/2015 | Hori | G06F 3/017 345/173 |
| 2016/0004380 A1* | 1/2016 | Kim | G06F 3/0416 345/174 |

(Continued)

FOREIGN PATENT DOCUMENTS

JP      2011-2891 A      1/2011
JP      2014-203183 A    10/2014

*Primary Examiner* — Tony Davis
(74) *Attorney, Agent, or Firm* — Canon U.S.A., Inc. IP Division

(57) ABSTRACT

An electronic device includes a posture detection unit configured to detect a posture of the electronic device; a touch detection unit configured to detect a touch on a touch panel; a function execution unit configured not to execute a function according to a touch when a touch area on an object area of the touch panel is equal to or greater than the threshold, while, to execute a function according to the touch when the touch area on the object area is less than the threshold, regardless of a touch area on an area other than the object area being less than or equal to or greater than the threshold; and a control unit configured to control the object area of the touch panel to be made different according to the posture detected by the posture detection unit.

17 Claims, 11 Drawing Sheets

(56) References Cited

U.S. PATENT DOCUMENTS

| | | | |
|---|---|---|---|
| 2016/0062645 A1* | 3/2016 | Masuko | G09G 5/00 345/173 |
| 2016/0224179 A1* | 8/2016 | Ichihara | G06F 3/0416 |
| 2016/0246434 A1* | 8/2016 | Mizunuma | G06F 3/0416 |
| 2016/0334867 A1* | 11/2016 | Yanai | G06F 3/011 |

* cited by examiner

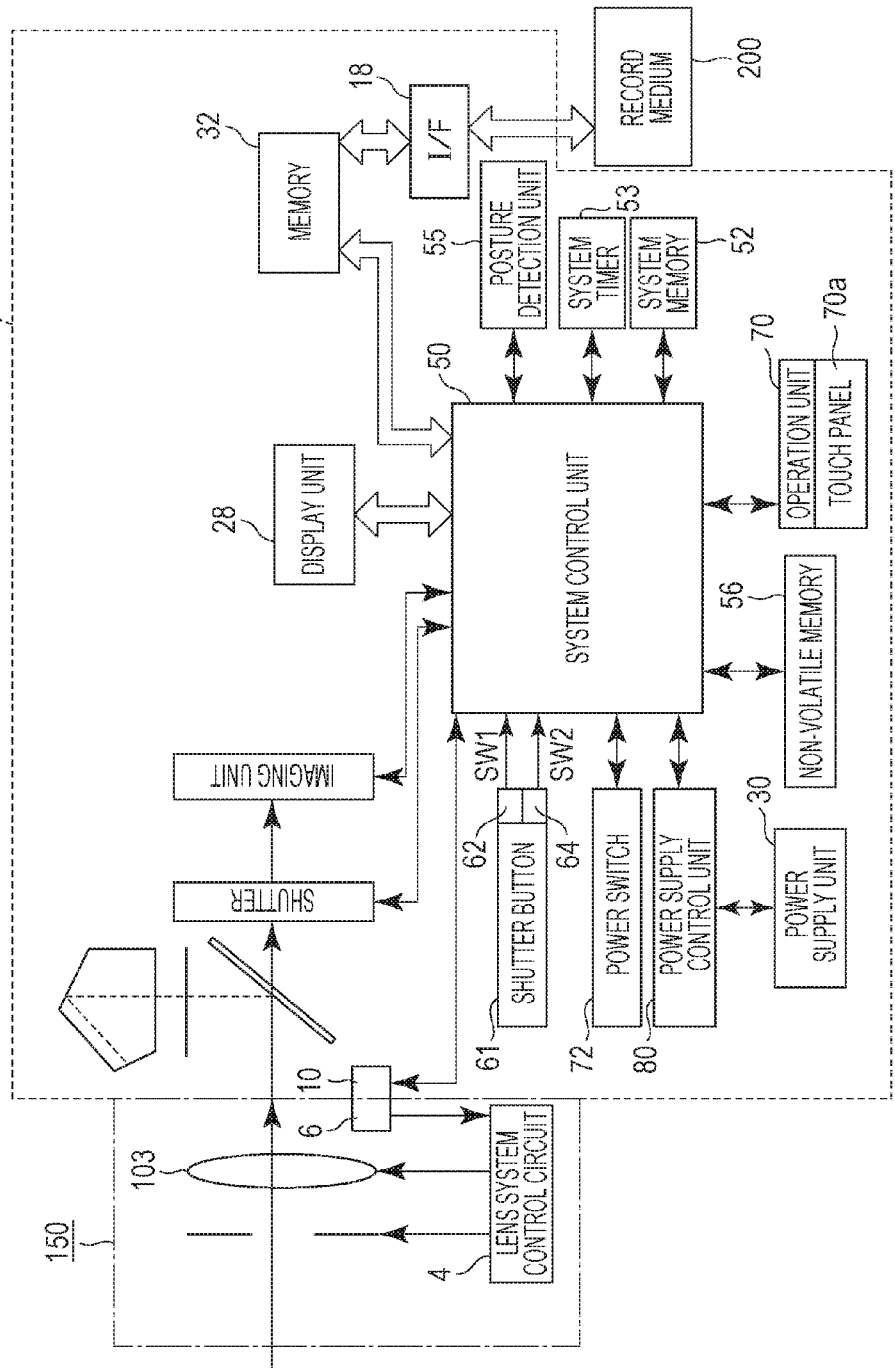

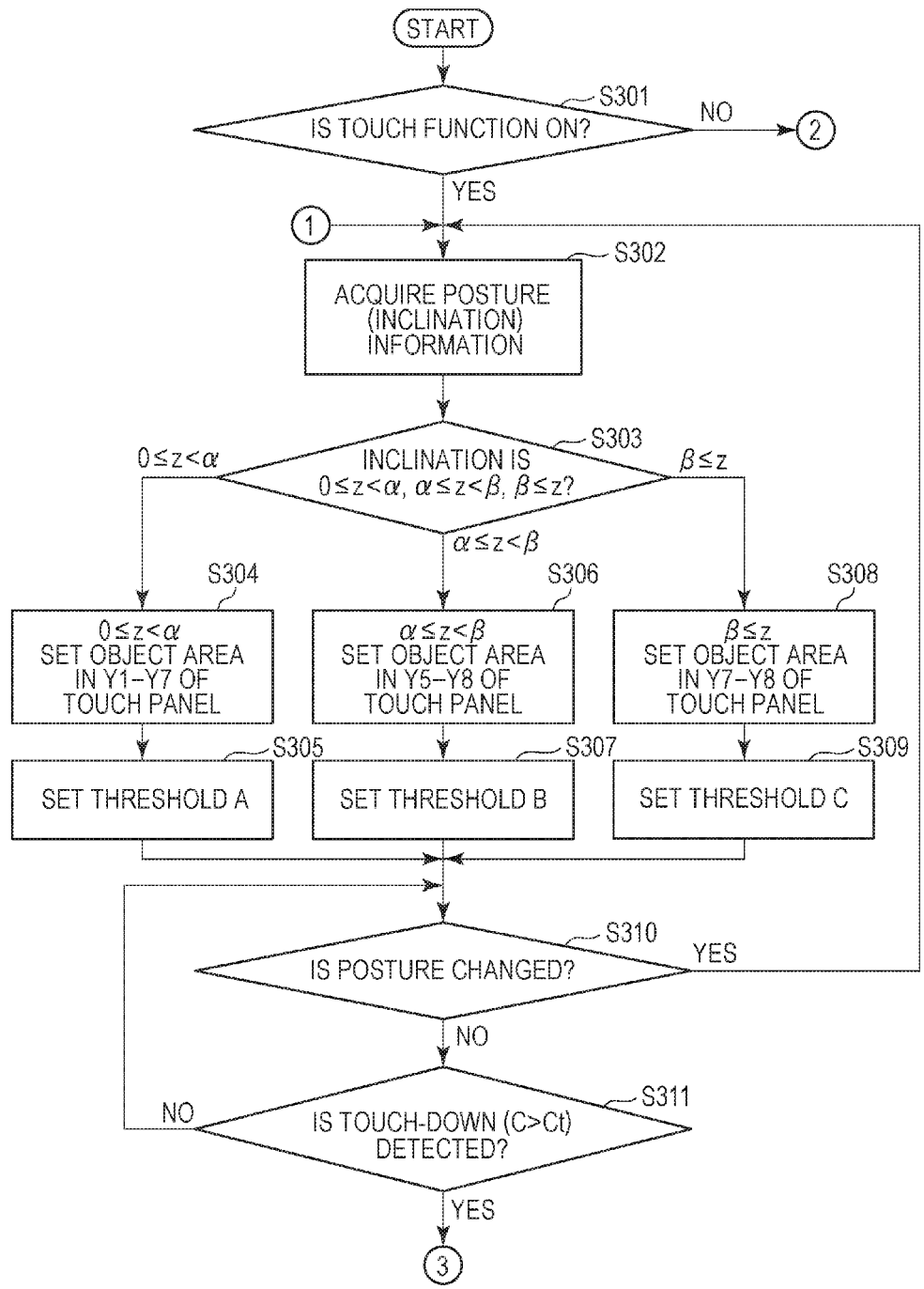

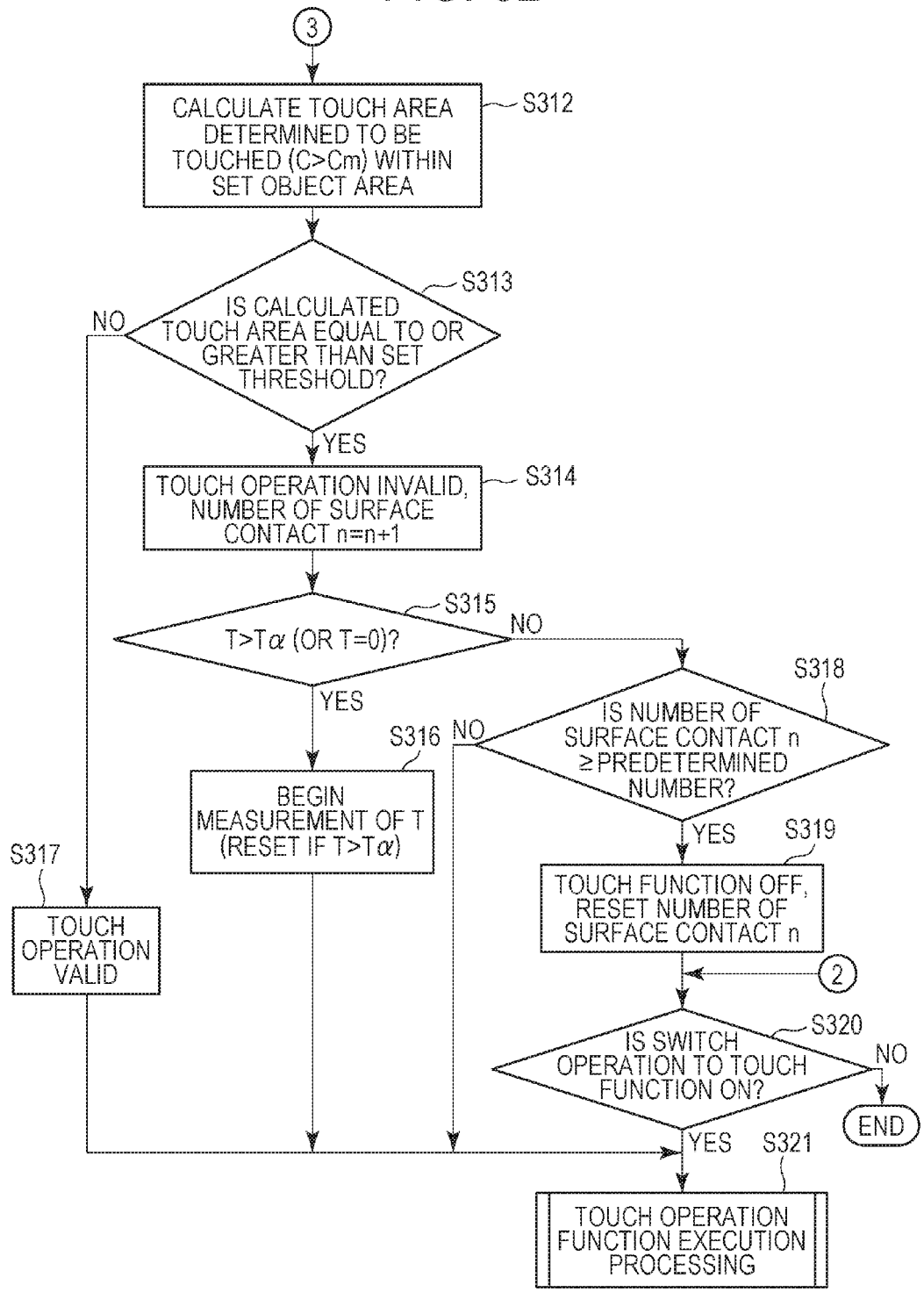

FIG. 5A
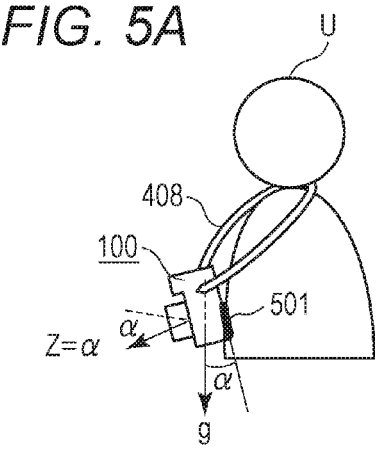
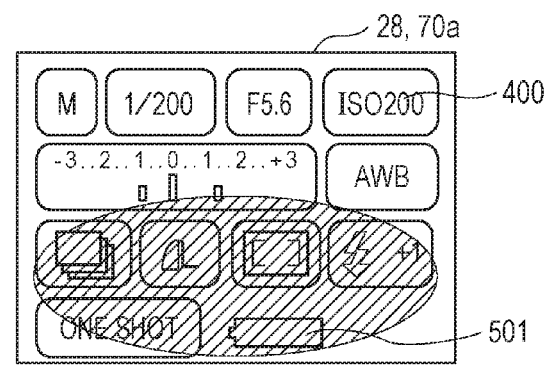
FIG. 5B
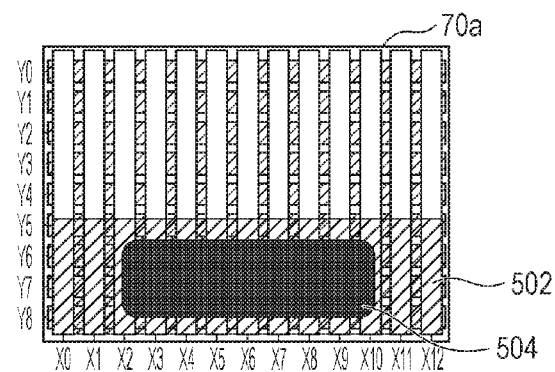
FIG. 5C
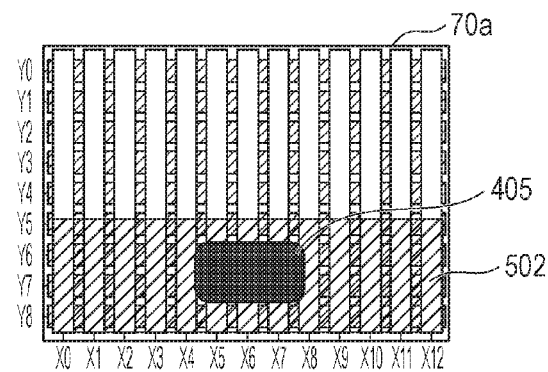
FIG. 5D
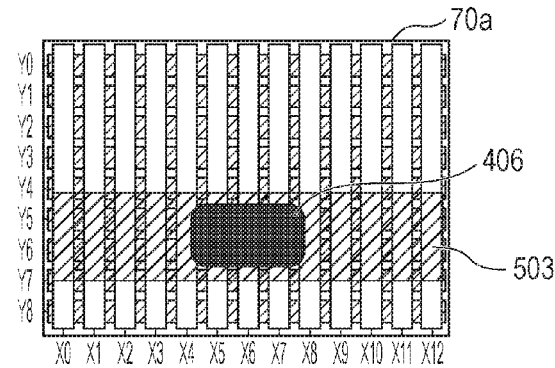

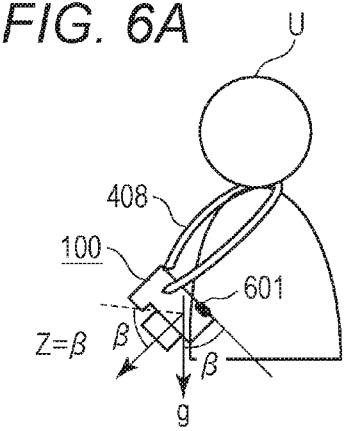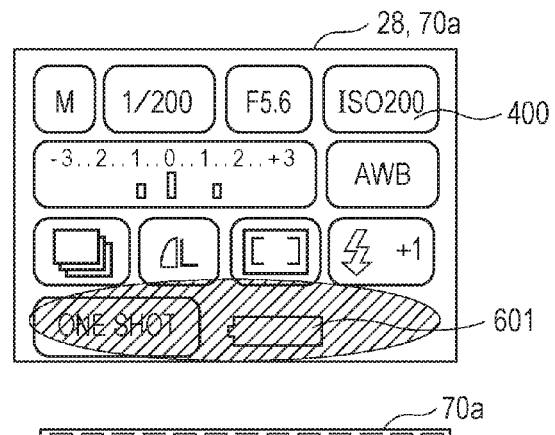
FIG. 6A
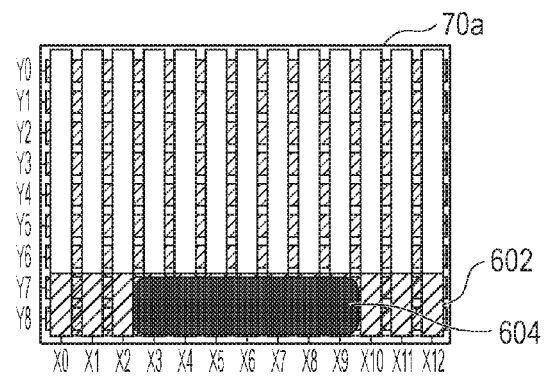
FIG. 6B
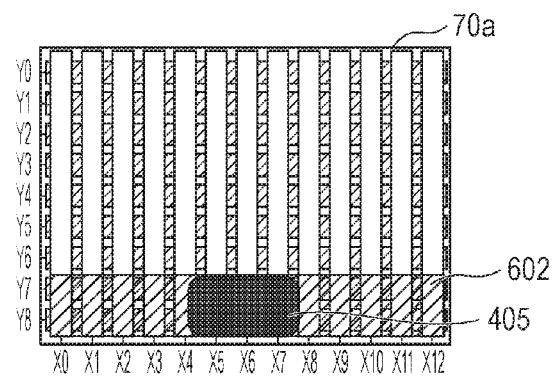
FIG. 6C
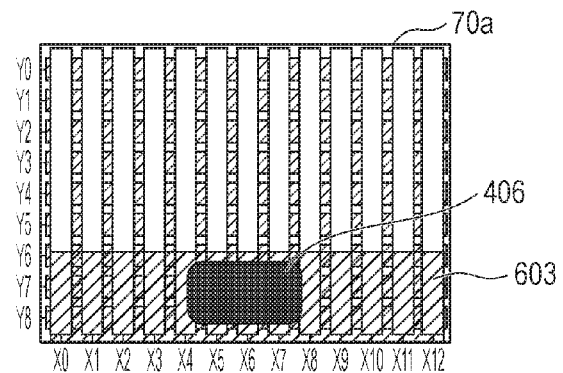
FIG. 6D

ELECTRONIC DEVICE, CONTROL METHOD THEREOF, AND STORAGE MEDIUM

BACKGROUND OF THE INVENTION

Field of the Invention

The present disclosure generally relates to electronics and, more particularly, to an electronic device which detects a touch operation, a control method thereof, and a storage medium. In particular, the present disclosure relates to a control technology capable of reducing malfunctions due to unintentional touches by a user.

Description of the Related Art

In a device having a touch panel which detects a touch operation, an unintentional function may be executed according to detection of a touch, even thorough the touch is an unintentional touch by a user. As a method for preventing a malfunction caused by an operation due to an unintentional touch by a user, there is one in which a function is not executed according to a touch operation made on a wide contact area (surface contact). Japanese Patent Application Laid-Open No. 2011-2891 describes that when a touch operation input to an area equal to or greater than a predetermined area on the touch panel is detected, such an input is invalidated. Further, Japanese Patent Application Laid-Open No. 2014-203183 discloses that predetermined areas on right and left edges of a touch panel where a user tends to touch unintentionally when holding the device are set to be object areas, and if a touch area on the object areas is equal to or greater than a threshold, a touch operation performed on the entire touch panel is invalidated.

As an exemplary case where an unintentional touch by a user is made, there is a case where a user carries a device such as a digital camera by hanging it from the neck or shoulder. When the user walks around with the device hung from the neck or shoulder in the case where the surface of the touch panel of the device is tilted against the user, surface contact is likely to be made on a partial area rather than the entire touch panel. Further, when the user performs a touch operation, it is likely that the device is tilted. If the entire touch panel is handled as an object area for determination as described in Japanese Patent Application Laid-Open No. 2011-2891, when a touch operation having a large touch area is performed intentionally, there is a possibility that it is detected as surface contact, although it is an intentional operation by the user. On the other hand, if the surface of the touch panel is in parallel with the user when the user walks around with the device hung from the neck or shoulder, the center area of the touch panel is likely to be in surface contact. If edge areas of a touch panel, which are likely to be in contact when the casing is held, is set as areas for detecting surface contact, as described in Japanese Patent Application Laid-Open No. 2014-203183, an unintentional touch on the center area of the touch panel may not be detected as surface contact even if it is an unintentional touch by a user.

SUMMARY OF THE INVENTION

In view of the comments described above, the present disclosure provides an electronic device capable of reducing malfunctions caused by unintentional touches by a user.

According to an aspect of the present disclosure, an electronic device includes: a posture detection unit configured to detect a posture of the electronic device; a touch detection unit configured to detect a touch on a touch panel; a function execution unit configured not to execute a function according to a touch when a touch area on an object area of the touch panel is equal to or greater than a threshold, while, to execute a function according to the touch when the touch area on the object area is less than the threshold, regardless of a touch area on an area other than the object area being less than or equal to or greater than the threshold; and a control unit configured to control the object area of the touch panel to be made different according to the posture detected by the posture detection unit.

Further features of the present disclosure will become apparent from the following description of exemplary embodiments (with reference to the attached drawings).

BRIEF DESCRIPTION OF THE DRAWINGS

FIGS. 2A and 2B illustrate an exemplary configuration of a digital camera.

FIGS. 3A and 3B are flowcharts of touch detection processing of the present embodiment.

FIGS. 5A to 5D illustrate areas relating to touch detection of the present embodiment.

FIGS. 6A to 6D illustrate areas relating to touch detection of the present embodiment.

DESCRIPTION OF THE EMBODIMENTS

An exemplary embodiment of the present disclosure will be described in detail below with reference to the accompanying drawings.

It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment.

Hereinafter, a preferred embodiment of the present disclosure will be described with reference to the drawings.

Figure 1A:
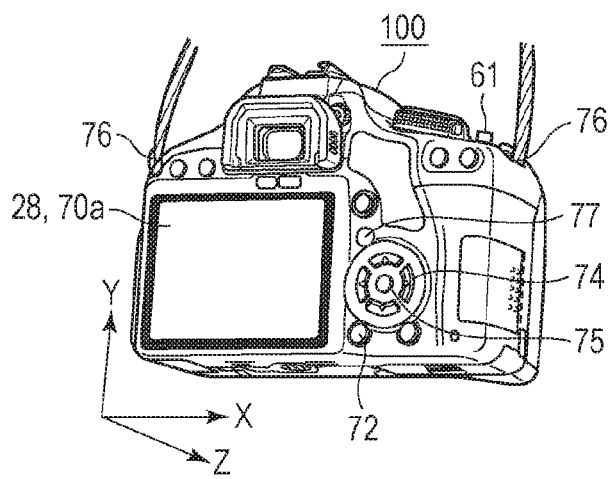
FIGS. 1A to 1D illustrate outer appearances of a digital camera.
Figure 1B:
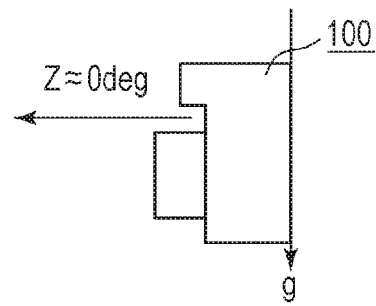
Figure 1C:
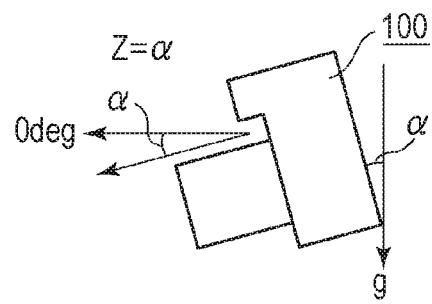
Figure 1D:
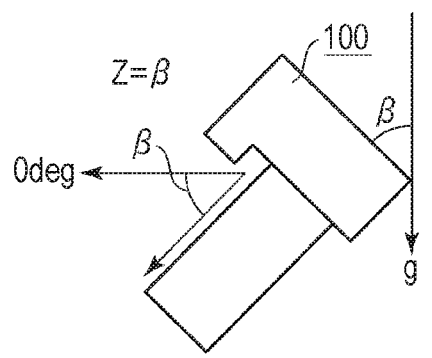

FIGS. 1A to 1D illustrate outer appearances of a digital camera 100 as an exemplary imaging device of the present disclosure. FIG. 1A is a rear perspective view (view seen from a side having a display unit 28 and a touch panel 70a) of the digital camera 100, and FIG. 1B to FIG. 1D are external views seen sideways, showing external views seen from a side surface which is a side of the rear surface. In FIGS. 1A to 1D, the display unit 28 is a display unit which displays images and various types of information, and the touch panel 70a, capable of detecting a touch operation, is provided so as to be superimposed on the display unit 28. A shutter button 61 is an operation unit for performing photographing instruction. A power switch 72 is an operation member for switching between ON and OFF of the power supply of the digital camera 100. An operation corresponding to a pressed portion of a cross key 74 can be made. A SET button 75, which is a press button, is included in an operation unit 70, and is mainly used for determining a selected item. The switch button 77 is a press button for switching whether a touch operation performed on the touch panel 70a is made valid or invalid. A strap portion 76 is a portion for attaching a strap such as a string (strap attachable portion).

When the user carries the digital camera 100 by putting the strap on the neck or shoulder, the user is able to perform photographing immediately without losing photographing opportunities. Further, directional axes, namely an X axis, a Y axis, and a Z axis, of the digital camera 100 are set as illustrated in FIG. 1A. The X axis and the Y axis extend in parallel with the surfaces of the touch panel 70a and the display unit 28, in which the X axis is a horizontal axis and the Y axis is a vertical axis. The Z axis extends in a direction vertical to the surfaces of the touch panel 70a and the display unit 28. A state where the surfaces of the touch panel 70a and the display unit 28 are in parallel with the gravity direction, and the Z axis shown in FIG. 1A extends in a direction vertical to the gravity direction, is defined as a standard state (z=0). An angle relative to the horizontal direction (direction vertical to the gravity direction) of the Z axis, when the digital camera 100 is tilted from the standard state, and an angle of the surface of the display unit 28 (touch panel 70a) relative to the gravity direction, is defined as an inclination. This means that when the surface of the display unit 28 is in parallel with the gravity direction, the inclination z is 0, and as the digital camera 100 is tilted more in the gravity direction, the z value showing the inclination becomes larger.

FIG. 1B shows a state where the inclination z of the digital camera 100 is 0, FIG. 1C shows a state where the inclination z is α, and FIG. 1D shows a state where the inclination z is β(>α). An inclination is calculated based on a state where the inclination z is 0 shown in FIG. 1B. It should be noted that an inclination of the digital camera 100 can be detected by a posture detection unit 55 or the like described below. When a user carrying the digital camera 100 with a strap, there is a possibility that even an unintentional touch by the user due to contact with the body or belongings of the user is detected as a touch and that a corresponding function is executed. In this way, when the user carries the digital camera 100 with the touch panel 70a facing the user side in a state where a touch operation is acceptable, the body or an article of the user may be in contact with the touch panel 70a so that it may be detected as a touch operation, although it is unintentional by the user. For example, when the user carries it in the state as shown in FIG. 1B, as the surface of the touch panel 70a is likely to be in contact with the body or the like of the user in parallel, a touch operation on the entire surface of the touch panel 70a is likely to be detected. When the user carries it in the states as shown in FIGS. 1C and 1D, the lower half of the touch panel 70a comes closer to the body of the user than the upper half thereof so that the lower half is likely to be in contact. Further, as the angle of inclination becomes larger, an area in the lower portion (gravity direction side) of the touch panel 70a is more likely to be in contact.

Figure 2B:
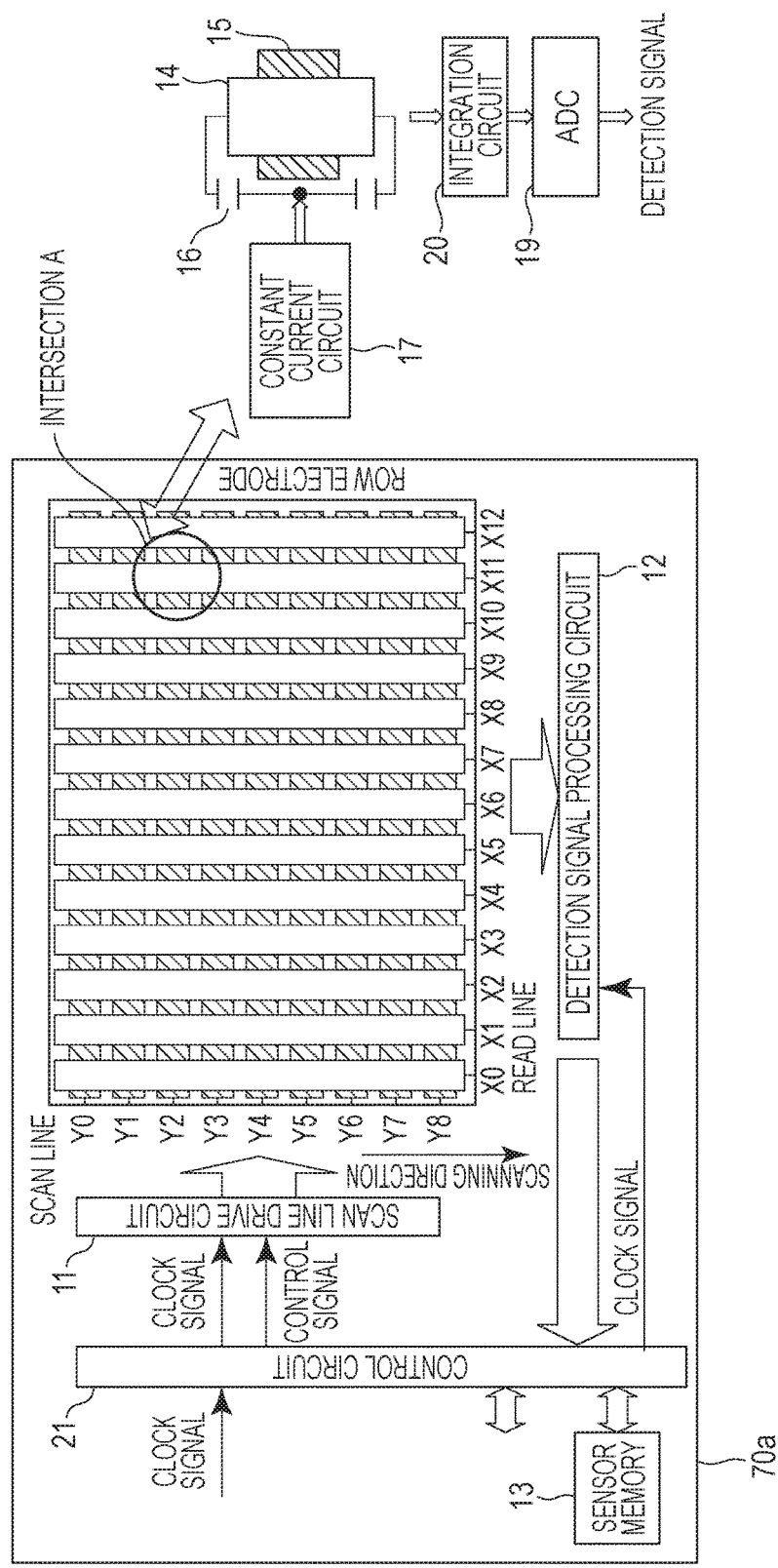

FIGS. 2A and 2B are block diagrams illustrating an exemplary configuration of the digital camera 100 according to the present embodiment. FIG. 2A is a block diagram illustrating an exemplary configuration of a mounted lens unit 150 and the entire digital camera 100, and FIG. 2B is a block diagram illustrating an exemplary configuration of the touch panel 70a. The hardware configuration of FIGS. 2A and 2B may include one or more processors and one or more memories and may be configured to operate, for example, as a posture detection unit, a touch detection unit, a function execution unit, and a control unit, as in the claims. As used herein, the term "unit" generally refers to any combination of software, firmware, hardware, or other component, such as circuitry, that is used to effectuate a purpose.

The lens unit 150 is a lens unit in which an exchangeable photographic lens is mounted. The weight and the size of the lens unit 150 differ according to the size and the number of pieces of the lenses, and the length thereof varies according to extension and contraction of the zoom.

While a lens 103 generally includes a plurality of lens, only one lens is shown in this example for the purpose of simplicity. A communication terminal 6 is a communication terminal for communications performed by the lens unit 150 with the digital camera 100 side, and a communication terminal 10 is a communication terminal for communications performed by the digital camera 100 with the lens unit 150 side. In this way, lens information can be transmitted to the digital camera 100 side via the communication terminals 6 and 10. Further, the lens unit 150 communicates with a system control unit 50 via the communication terminals 6 and 10, and displaces the position of the lens 103 by an internal lens system control circuit 4 to thereby focus the lens. The length of the lens unit 150 varies according to the displacement of the lens position.

A memory 32 stores image data converted to digital data, and image data to be displayed on the display unit 28. The memory 32 has a storage capacity sufficient for storing a predetermined number of still images and moving images and sounds for a predetermined period.

The display unit 28 is a rear monitor for displaying images, and is provided on the rear side of the digital camera 100. The display unit 28 is not necessarily a liquid crystal display but also a display of another type such as organic EL (electroluminescence), provided that it displays images.

A non-volatile memory 56 is an electrically erasable and recordable memory. For example, EEPROM (electrically erasable programmable read-only memory) or the like is used. In the non-volatile memory 56, constants for operation of the system control unit 50, programs, and the like are stored. The programs mentioned herein mean programs for carrying out various types of flowcharts described below in the present embodiment.

The system control unit 50, which may include one or more processors, controls the entire digital camera 100. By executing the program stored in the non-volatile memory 56, the system control unit 50 realizes respective types of processing of the present embodiment described below.

In a system memory 52, constants and variables for operation of the system control unit 50, programs read from the non-volatile memory 56, and the like are developed. As the system memory 52, a RAM (random access memory) or the like is used. Further, the system control unit also performs display control by controlling the memory 32, the display unit 28, and the like.

A system timer 53 is a timer which measures the times used for various types of control and the time of the incorporated clock.

A first shutter switch 62, a second shutter switch 64, and an operation unit 70 are operation means for inputting various operation instructions to the system control unit 50.

A posture detection unit 55 detects the posture (inclination) of the digital camera 100 relative to the gravity direction. Based on the posture detected by the posture detection unit 55, it is possible to determine whether an image captured by an imaging unit 22 is an image captured by the digital camera 100 held horizontally or held vertically. The system control unit 50 is able to add orientation information according to the posture detected by the posture detection unit 55 to an image file of the image captured by the imaging unit, or record the image by turning it. As the posture detection unit 55, an acceleration sensor or a gyro sensor may be used. Further, according to the detected inclination, the system control unit 50 is able to set a threshold, conditions, and the like for touch detection by the touch panel 70a, as described below.

The first shutter switch 62 is turned on in the middle of an operation, that is, a so-called half-push operation (image capturing preparation instruction), of the shutter button 61 provided to the digital camera 100, and generates a first shutter switch signal SW1. The second shutter switch 64 is turned on when an operation of the shutter button 61 is completed, that is, a so-called full push operation (image capturing instruction), and generates a second shutter switch signal SW2. With the second shutter switch signal SW2, the system control unit 50 begins operation of a series of photographing processing from readout of a signal from the imaging unit until writing of image data into a recording medium 200. To the respective operation members of the operation unit 70, functions are assigned appropriately for each scene by selecting and operating various function icons displayed on the display unit 28, and they act as various function buttons. The function buttons include an end button, a back button, an image feed button, a jump button, a narrowing-down button, an attribute change button, and the like. For example, when a menu button is pressed, a menu screen on which various settings can be made is displayed on the display unit 28. A user is able to perform various settings intuitively with use of a menu screen displayed on the display unit 28, a cross key 74 which is a four-way button in up, down, right, and left directions, and a SET button.

The operation unit 70 serves as various operation members as an input unit which accepts operations from the user. The operation unit 70 includes operation units of at least the shutter button 61, a power switch 72, the cross key 74, the SET button 75, a switch button 77, and the touch panel 70a.

A power supply control unit 80 includes a battery detection circuit, a DC-DC (direct current to direct current) converter, a switching circuit for switching a block to be conducted, and the like, and detects whether or not a battery is mounted, battery type, and battery remaining capacity. Further, the power supply control unit 80 controls the DC-DC converter based on the detection result and an instruction from the system control unit 50, and supplies a desired voltage for a time period to respective units including the recording medium 200.

A power supply unit 30 is configured of a primary battery such as an alkali battery or a lithium battery, a secondary battery such as a NiCd (nickel cadmium) battery, a NiMH (nickel metal hydride) battery, or a Li (lithium) battery, an AC (alternating current) adapter, and the like.

A recording medium I/F (interface) 18 is an interface with the recording medium 200 such as a memory card or a hard disk. The recording medium 200 is a recording medium such as a memory card for storing captured images, and is configured of a semiconductor memory, a magnetic disk, or the like.

As described above, the digital camera 100 includes the touch panel 70a capable of detecting contact made on the display unit 28, as one member of the operation unit 70. The touch panel and the display unit 28 may be configured integrally. For example, the touch panel may be configured such that the light transmittance thereof does not disturb displaying of the display unit 28, and attached on the upper layer of the display surface of the display unit 28. Then, an input coordinate on the touch panel is associated with the display coordinate on the display unit 28. Thereby, it is possible to configure a graphical user interface (GUI) which allows the user to operate as if the user was able to directly operate the screen displayed on the display unit 28. The system control unit 50 is able to detect operations performed on the touch panel or states as described below.

A finger or a pen, not having touched the touch panel, newly touches the touch panel. That is, the start of touching (hereinafter referred to as Touch-Down).

A state where the touch panel is touched by a finger or a pen (hereinafter referred to as Touch-On).

Moving while touching the touch panel with a finger or a pen (hereinafter referred to as Touch-Move).

Separating a finger or a pen having touched the touch panel. That is, the end of touching (hereinafter referred to as Touch-Up).

A state where the touch panel is not touched by anything (hereinafter referred to as Touch-Off).

When Touch-Down is detected, Touch-On is also detected simultaneously. After Touch-Down, unless Touch-Up is detected, Touch-On is kept detected, normally. Touch-Move is detected also in a state where Touch-On is being detected. Even when Touch-On is detected, if the touch position does not move, Touch-Move is not detected. After detection of Touch-Up of all of the fingers or pen having been touched, the state becomes Touch-Off.

These operations and states, and the position coordinate where a finger or a pen is touched on the touch panel are notified to the system control unit 50 through an internal bus, and based on the notified information, the system control unit 50 determines what kind of operation has been performed on the touch panel. As the touch panel, a touch panel of any type such as a resistive film type, an electrostatic capacity type, a surface acoustic wave type, an infrared type, an electromagnetic induction type, an image recognition type, or an optical sensor type may be used. Depending on the type, a touch may be detected when contact is made on the touch panel, or a touch may be detected when a finger or a pen approaches the touch panel. However, any method may be used.

Next, configuration of the touch panel 70a will be described with use of a block diagram of the touch panel 70a in FIG. 2B.

A control circuit 21 of the touch panel includes a PLL (phase locked loop) circuit therein for generating a clock signal, with an external clock input or an internal oscillator circuit being a source oscillation. With the PLL circuit, it is possible to change a cycle of one scan or a cycle of one sub scan.

A scan line drive circuit 11 and a detection signal processing circuit 12 are driven by a clock signal supplied by the control circuit 21. The control circuit 21 detects whether or not a detection signal value of each electrode, output from the detection signal processing circuit 12, exceeds an arbitrary threshold for touch determination, and if it exceeds, sequentially transfers data to a sensor memory 13 while attaching a touch detection flag. When scanning of one frame is completed, from detection data of one frame stored in the sensor memory 13, grouping of touch detection areas and gravity computation of the touch position are performed, whereby the number of touches detected and the touch detection coordinates are calculated. As one scanning of one frame is performed by taking a predetermined time such as 2 ms (millisecond), the total amount of touch points detected within a scanning time (within a predetermined time) forms a touch area.

Further, in scanning of one frame, if the number of intersections (the number of sensor intersections) on which a touch is detected within a predetermined area set in advance on the touch panel is equal to or greater than a predetermined number, it is possible to determine that it is contact with a surface having a predetermined area or larger (surface contact). An area for detecting surface contact and a condition on the number of intersections for determining as surface contact may be changed arbitrarily by the control circuit 21 of the touch panel according to an instruction from the system control unit 50.

The touch panel 70a is a touch panel of an electrostatic capacity type, including electrodes in which a plurality of column electrodes arranged in columns and a plurality of row electrodes arranged in rows are orthogonal to each other. The row electrodes of the orthogonal electrodes are used as scan lines, and the column electrodes are used as read lines. The row electrodes are commonly used as electrodes for applying a common drive signal VCOM of the display unit 28. The common drive signal VCOM determines a display voltage of each pixel, together with a pixel voltage to be applied to a pixel electrode not shown. As such, a row electrode unit is formed on a TFT (thin film transistor) substrate of the display unit 28. Meanwhile, a column electrode unit is formed on a color filter glass substrate, not shown, of the display unit 28. As shown in FIG. 2B, in the present embodiment, the range of the touch panel 70a is described based on a premise that nine row electrodes Y0 to Y8 and thirteen column electrodes X0 to X12 are aligned, and a range in the Y-axis direction includes Y0 to Y8 and a range in the X axis direction includes X0 to X12.

In FIG. 2B, an enlarged view of an intersection A of electrodes of the touch panel 70a is shown on the right side. A row electrode 15 is connected with a constant current circuit 17, and a column electrode 14 is fixed to a predetermined potential. When a weak current is flown by the constant current circuit 17, a charge is accumulated in a mutual capacitance 16 generated between the column electrode 14 and the row electrode 15. Sub scanning in which a plurality of times of accumulation is performed per intersection is performed, and integration is performed by an integration circuit 20. A result of measurement of one intersection (one scan) is converted into a digital signal by an A/D (analog to digital) converter 19. The variation of the detection signal value is measured as an electrostatic capacity variation C, whereby it is possible to determine presence or absence of touch detection. It should be noted that while in the present embodiment description is given using a method of detecting a touch operation and a touch area by the electrostatic capacity, the present embodiment is effective even with a type other than the electrostatic capacity type.

Next, a flow of touch detection processing in the present embodiment will be described with use of FIGS. 3A and 3B. This processing is realized such that a program stored in the non-volatile memory 56 is developed in the system memory 52 and is executed by the system control unit 50.

At S301, the system control unit 50 determines whether or not the touch function is ON. The touch function is a function of accepting a touch operation that when a touch operation performed on the touch panel 70a is detected, whether or not execution of processing according to the touch operation is valid, or whether or not a touch operation on the touch panel 70a is detectable. ON and OFF of the touch function can be set (switched) on the menu screen. If it is determined that touch function is ON, the processing proceeds to S302, while if not, the processing proceeds to S320. It should be noted that the state of the touch function set on the menu screen or the state of the touch function OFF set at S319 is stored in the non-volatile memory 56. At S301, by reading the setting set, it is determined whether the touch function is in an ON state or an OFF state.

At S302, the system control unit 50 acquires posture information (inclination information) of the digital camera 100. The posture of the digital camera 100 is acquired from the value of the inclination detected by the posture detection unit 55.

At S303, the system control unit 50 determines, from the posture information acquired at S302, an inclination range in which the inclination (inclination relative to the gravity direction of the display unit 28) of the digital camera 100 is included. In the present embodiment, it is determined that in which inclination range among the ranges of $0 \le z < \alpha$, $\alpha \le z < \beta$, and $\beta \le z$ the inclination is included. If the acquired inclination z is determined that $0 \le z < \alpha$, the processing proceeds to S304, if it is determined that $\alpha \le z < \beta$, the processing proceeds to S306, and if it is determined that $\beta \le z$, the processing proceeds to S308.

At S304, S306, and S308, a range of the touch panel 70a for calculating a touch area determined to be touched, of the surface contact determination conditions, is set. The range of the touch panel 70a for calculating the touch area is referred to as an object area. Here, surface contact means a touch in which the touch area determined to be a touch on the touch panel 70a is equal to or greater than a threshold. When surface contact is detected, it is determined to be an unintentional touch by a user, rather than a small touch operation intentionally performed by the user, and the touch operation detected when the touch is detected is invalidated. This means that a touch operation, which is performed when a touch of an area equal to or greater than a threshold is detected, is invalidated.

At S304, the system control unit 50 sets the object area to be in a range from Y1 to Y7 of the Y axis coordinates of the touch panel 70a. The range from Y1 to Y7 is a range surrounding a center area of the touch panel 70a. It should be noted that a range of X axis coordinates is set to be in a certain range (X0 to X12) regardless of the inclination. However, the range of the object area in the X axis direction may be changed according to the inclination. The range of the object area will be described below using FIGS. 4A to 6D.

At S305, the system control unit 50 sets an area threshold A to be a threshold for determining whether or not a touch corresponding to the calculated touch area is surface contact. The value of the threshold will be described below using FIGS. 4A to 6D.

At S306, the system control unit 50 sets the object area to be in a range from Y5 to Y8 of Y axis coordinates of the touch panel 70a. The range from Y5 to Y8 is a range of a lower half area (area shown as a prediction area 501 in FIG. 5A) slightly lower than the center area of the touch panel 70a.

At S307, the system control unit 50 sets an area threshold B to be the threshold.

At S308, the system control unit 50 sets the object area to be in an area from Y7 to Y8 of Y axis coordinates of the touch panel 70a. The area from Y7 to Y8 is a range of an area of the touch panel 70a along a lower side or a lower edge of the touch panel 70a and is a lower area (area shown as a prediction area 601 in FIG. 6A) which is a further lower area than the lower half area.

At S309, the system control unit 50 sets an area threshold C to be the threshold. It should be noted that if the value of the threshold is not changed according to the inclination of the digital camera 100, it is not necessary to set the threshold by dividing the processing into S305, S307, and S309.

At S310, the system control unit 50 determines whether or not the posture of the digital camera 100 has been changed from the time when the latest posture information of the digital camera 100 is acquired at S302. If it is determined that the posture of the digital camera 100 has been changed, the processing returns to S302, while if not, the processing proceeds to S311.

At S311, the system control unit 50 determines whether or not there is Touch-Down (touch operation), using the entire surface of the touch panel 70a as the target. This means that it is determined whether or not there is Touch-Down at any position on the entire surface of the touch panel 70a. If the value of an electrostatic capacity variation C detected by the value converted to a digital signal by the A/D converter 19 is larger than Ct, it is determined that a touch operation is performed on the intersection, while if not, it is determined that a touch operation on the intersection is not performed. When it is determined that a touch operation is performed on any intersection on the touch panel 70a, the processing proceeds to S312, while if not, the processing proceeds to S310.

At S312, the system control unit 50 calculates the touch area of a touch determined to be touched in the object area set in any of S304, S306, and S308. If the detected electrostatic capacity variation C is larger than Cm (<Ct), the intersection is determined to be touched. The touch area is calculated from the total sum of the intersections determined to be touched. In order to detect touch operations detected within a predetermined time, if Touch-Move operation such as swipe or flick is performed, a larger touch area is detected than the case of performing Touch-On operation or the like. As such, if a threshold of a touch area for detecting surface contact is reduced, even an intentionally performed Touch-Move operation may be detected as an invalid operation, whereby the user operability may deteriorate.

Further, if a threshold Cm for determining a touch (detection of an intersection included in the touch area) is set to be smaller than a threshold Ct for detecting a touch operation, a weak touch like unintentional contact on the touch panel 70a by the user, with the body or the palm of a hand of the user, is more likely to be detected. Further, if the threshold Ct for detecting a touch operation is set to be larger than the threshold Cm for determining a touch, an intentional touch by the user with a finger or the like of the user is more likely to be detected. As such, in the determination at S311, a weak touch other than an intentional touch operation by the user can be excluded easily.

At S313, the system control unit 50 determines whether or not the touch area calculated at S312 is equal to or greater than the threshold set in any of S304, S306, and S308. If the touch area is equal to or greater than the threshold, the processing proceeds to S314, while if not, the processing proceeds to S317. A touch performed in an area other than the object area is not included in the touch area determined at S313. As such, if the touch area within the object area is less than the threshold, even if a touch operation of a large area (touch area is equal to or greater than the threshold) is performed in an area other than the object area, the determination is NO. As such, the area of a touch on an area other than the object area is not included in the touch area determined at S313. Even if the touch area of a touch operation intentionally performed on an area other than the object area is large, the operation is valid.

At S314, the system control unit 50 determines that the touch operation detected at S311 is invalid, and adds 1 to the number of times n of surface contact, whereby n=n+1. Further, the system control unit 50 stores, in the system memory 52, that the touch operation is invalid. If a touch operation is invalid, even if a touch operation is performed, it is configured not to execute a function corresponding to the touch operation or not to detect the touch operation. The number of times n of surface contact is a count for detecting that the number of times that surface contact is detected within a predetermined time Tα becomes a predetermined number of times N or larger. When it becomes n≥N, the touch function becomes OFF.

At S315, the system control unit 50 determines whether or not the surface contact measurement time T has passed Tα or more. The surface contact measurement time T is a time measured for determining whether or not surface contact is made a predetermined number of times such as three times to five times or more within the predetermined time (Tα) such as 10 seconds or 20 seconds, which is measured by the system timer 53. If it is determined that the surface contact measurement time T is T≥Tα or T=0, the processing proceeds to S316, while if not, the processing proceeds to S318.

At S316, the system control unit 50 begins measurement of the surface contact measurement time T. As the surface contact measurement time T determined at S315 is equal to or greater than Tα or 0, time measurement is performed again. However, if it is determined to be T≥Tα, measurement is performed after resetting it to T=0.

At S317, the system control unit 50 determines the touch operation detected at S311 to be valid, and stores, in the system memory 52, that the touch operation is valid. When the touch operation is valid, a function corresponding to the touch operation is executed. Examples of functions corresponding to touch operations include selection of an item shown on a touch point on which a touch operation is performed as described below, page switching by Touch-Move to an item such as an image, and the like. It should be noted that even though a touch area on the object area is less than a threshold, if there is no function corresponding thereto, no function is executed corresponding to the touch.

At S318, the system control unit 50 determines whether or not the latest number of times n of surface contact counted at S314 becomes n≥N. If it is determined that the number of times of surface contact becomes n≥N, the processing proceeds to S319, while, if not, the processing proceeds to S302.

At S319, the system control unit 50 sets the touch function to OFF, and sets the number of times n of surface contact to n=0.

At S320, the system control unit 50 determines whether or not an operation of switching the touch function to ON is performed. An operation of switching the touch function from OFF to ON may be performed by pressing the switch button 77 or using the menu screen. If it is determined that an operation of switching the touch function to ON is performed, the processing proceeds to touch operation function execution processing of S321, while if not, the processing ends. The touch operation function execution processing of S321 will be described in detail in FIGS. 7A and 7B.

Next, setting of an object area and a threshold which are surface contact determination conditions of the digital camera 100, described regarding S304, S306, and S308 in FIG. 3A, will be described in detail using FIG. 4A to FIGS. 6D.

Figure 4A:
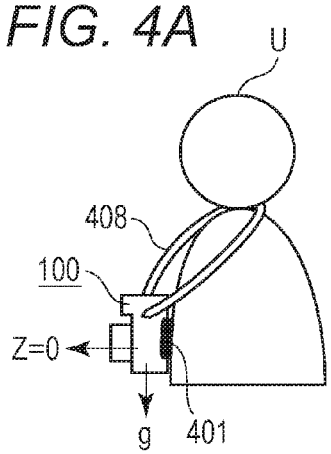
FIGS. 4A to 4D illustrate areas relating to touch detection of the present embodiment.

With use of FIG. 4A, FIG. 5A, and FIG. 6A, inclination of the digital camera 100 and a contact surface of the touch panel 70a will be described. With use of FIGS. 4B and 4C, FIGS. 5B and 5C, and FIGS. 6B and 6C, the case of setting an object area according to the inclination of the digital camera 100 will be described. Next, with use of FIG. 4B, FIG. 5B, and FIG. 6B, the case of setting a threshold for determining surface contact according to the inclination of the digital camera 100 will be described. Finally, when a threshold is constant regardless of the inclination, the case of changing the size of the object area will be described with use of FIG. 4C, FIG. 5C, and FIG. 6C, and the case of changing the position of an object area, having a certain size, according to the inclination will be described with use of FIG. 4D, FIG. 5D, and FIG. 6D. FIGS. 4A to 4D illustrate the processing of S304 and S305 described above, FIGS. 5A to 5D illustrate the processing of S306 and S307 described above, and FIGS. 6A to 6D illustrate processing of S308 and S309 described above.

[Regarding Inclination of the Digital Camera 100 and a Contact Surface of the Touch Panel 70a]

FIG. 4A, FIG. 5A, and FIG. 6A illustrate postures of the digital camera 100 when a user U wears a strap 408 attached to the digital camera 100 on the neck, and prediction areas where the body or the like of the user U is likely to be brought into contact according to each posture (inclination). The left side of each of FIG. 4A, FIG. 5A, and FIG. 6A shows the user U and the inclination of the digital camera 100, showing an area where the touch panel 70a is likely to be touched by the body of the user U. Further, with an area which is likely to be touched being a prediction area, the touch panel 70a shown on the right side of each of FIG. 4A, FIG. 5A, and FIG. 6A illustrates the details thereof.

The display unit 28 in each of FIG. 4A, FIG. 5A, and FIG. 6A shows an item display screen 400. It is possible to change setting of each displayed item corresponding to an acceptance of a touch operation performed on each displayed item displayed on the item display screen 400.

FIG. 4A shows the case where the inclination z of the digital camera 100 is 0 (parallel). When the inclination z=0, an unintentional touch (surface contact) by the user U is likely to be made on the entire touch panel 70a (display unit 28) shown as a prediction area 401.

FIG. 5A shows the case where the inclination z of the digital camera 100 is $\alpha$. When the inclination z=$\alpha$, an unintentional touch by the user U is likely to be made to the lower half area on the touch panel 70a shown as a prediction area 501.

FIG. 6A shows the case where the inclination z of the digital camera 100 is $\beta$ (>$\alpha$). When the inclination z=$\beta$, an unintentional touch by the user U is likely to be made to an area on the touch panel 70a shown as a prediction area 601. When the inclination z=$\beta$ (as the inclination is larger), an unintentional touch by the user U is likely to be made to a further lower area along the lower edge (area of about one fourth) than that in the case of inclination z=$\alpha$.

As described above, as shown in FIGS. 4A, 5A, and 6A, the position of an area where unintentional contact on the touch panel 70a is predicted to be made (prediction area) varies, according to the inclination of the digital camera 100.

As such, in the case where the upper left of the touch panel 70a, viewed from the rear surface of the display unit 28, is set to be the origin of the X axis and the Y axis, as the inclination (inclination relative to the gravity direction of the surface of the display unit 28) is larger, a downward area of the Y axis, of the X axis and Y axis plane on the touch panel 70a, is likely to be in contact. Further, while the center area of the touch panel 70a becomes a prediction area when the inclination z of the digital camera 100 is 0, as the inclination becomes larger, a narrow lower area in the Y axis becomes likely to be in contact, and the size of the prediction area is also reduced.

[The Case of Setting an Object Area According to the Inclination of the Digital Camera 100]

FIGS. 4B and 4C, FIGS. 5B and 5C, and FIGS. 6B and 6C show examples of object areas for detecting a touch area for determining surface contact and the size of thresholds for determining surface contact, on the touch panel 70a superimposed on the display unit 28.

Figure 4B:
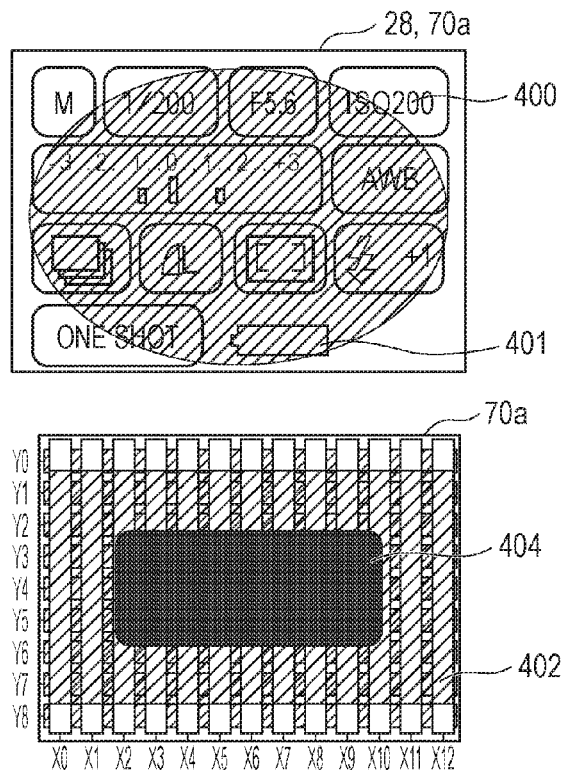
Figure 4C:
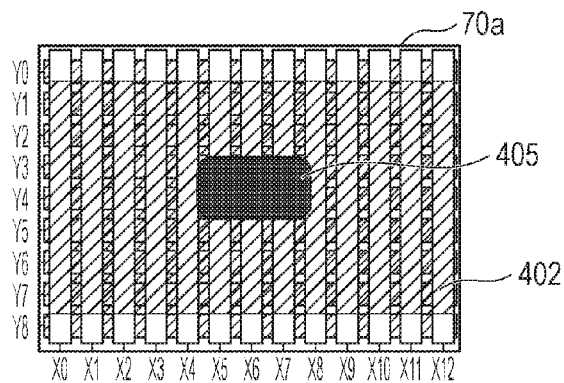

As shown in an object area 402 of FIGS. 4B and 4C, when the inclination z=0, an almost entire area of the touch panel 70a, which is likely to be in surface contact and overlaps a prediction area 401, is set to be an object area 402 for detecting surface contact. As the prediction area 401 is in a range from Y1 to Y7 of Y axis coordinates on the touch panel 70a, the object area 402 is also set to be included in the range from Y1 to Y7 of the Y axis coordinates.

As shown in an object area 502 of FIGS. 5B and 5C, when the inclination z=$\alpha$, an area which is a lower half of the touch panel 70a and overlaps a prediction area 501 is set to be the object area 502 for detecting surface contact. As the prediction area 501 is in a range from Y5 to Y8 of Y axis coordinates on the touch panel 70a, the object area 502 is also set to be included in the range from Y5 to Y8 of the Y axis coordinates.

When the inclination z=$\beta$, an area which is lower one fourth area of the touch panel 70a and overlaps a prediction area 601 of FIG. 6A is set to be an object area 602 for detecting surface contact, as shown in FIGS. 6B and 6C. As the prediction area 601 is in a range from Y7 to Y8 of Y axis coordinates on the touch panel 70a, the object area 602 is also set to be included in the range from Y7 to Y8 of the Y axis coordinates.

When the inclination z=$\beta$, if a touch area is calculated using the center area of the touch panel 70a like the object area 402 of FIG. 4A to 4D, it is highly likely that surface contact is not detected even though surface contact is made. When the inclination z=$\beta$, there is a high possibility that a touch operation, when surface contact (unintentional touch by a user) is made on the prediction area 601, is an unintentional touch operation by the user, as described above. When surface contact is made on the prediction area 601, even though a touch area is calculated using a center area like the object area 402 as a target, the calculated touch area is smaller than the area actually touched on the touch panel 70a. Consequently, there is a high possibility that it is not detected as surface contact. If it is not detected as surface contact although an unintentional touch of a large touch area is made, a change in item setting, image capturing, or the like may be performed by an unintentional touch. Accordingly, if an object area is set to an area corresponding to the prediction area 601 when the inclination z=$\beta$, the possibility of detecting surface contact on the area where surface contact is made when the inclination z=$\beta$, is increased. Further, as the possibility of detecting surface contact is increased, the possibility of executing a function unintended by the user is reduced.

Further, even in the case where a touch area is calculated using an area of about lower one fourth of the touch panel 70a like the object area 602 when the inclination z=0, the calculated touch area becomes smaller than the actual touch area, although surface contact is made to the center area like the prediction area 401. As such, although surface contact is made, the possibility of not detecting it as surface contact is increased. Accordingly, by setting an object area to an area corresponding to the prediction area 401 when the inclination z=0, the possibility of detecting surface contact on the area where surface contact is made when the inclination z=0, is increased.

On the other hand, if the entire touch panel 70a is set to be an object area, there is a possibility of erroneously detecting it as surface contact although it is not surface contact. In the item display screen 400 shown in each of FIGS. 4A, 5A, and 6A, display items are displayed on the entire display unit 28 (touch panel 70a), and a touch operation is accepted on almost the entire surface of the touch panel 70a. Further, when the user operates the touch panel 70a of the digital camera 100, the user often performs operation by slightly tilting the digital camera 100 so that the display unit 28 can be seen easily, rather than holding the digital camera 100 vertically. In this way, when the user performs operation on the item display screen 400 by allowing the digital camera 100 to have an inclination z=α, if the user operates Touch-Move or the like to the upper half area on the touch panel 70a, a touch area is calculated to be large. If the calculated touch area is larger than a threshold set, it is determined to be surface contact although it is an intentional operation by the user, whereby the touch operation is invalid. By setting a large threshold as described above, the possibility of determining an operation such as Touch-Move to be a valid operation becomes higher. However, when an unintentional touch is made by the user, surface contact is less likely to be determined. This means that if the entire touch panel 70a is set as an object area, the possibility that a touch operation intended by the user is determined to be an unintentional operation by the user becomes higher. As such, in the case where the digital camera 100 is tilted by the inclination z=α, by setting the area corresponding to the prediction area 501 to be an object area, the possibility of determining it as surface contact, even though a touch operation intended by the user is performed, is reduced.

Accordingly, it is possible to determine an unintentional touch by the user U more accurately by setting an area overlapping the prediction area 401 to be an object area when the inclination z of the digital camera 100 is 0, while setting an area overlapping the prediction area 501 when the inclination z=α. Further, by accurately determining (detecting) an unintentional touch by a user to be surface contact, the possibility of executing a function unintended by the user is reduced.

It should be noted that when the inclination z of the digital camera 100 in FIG. 6A is β(>α), an area where the possibility of an unintentional touch by a user is high is shown as the prediction area 601. When the inclination z=β, it is possible to detect surface contact more accurately by setting a small area, in a further lower portion on the touch panel 70a than that of the case where the inclination z=α, to be the object area 602.

Further, if setting is made such that an area not included in the prediction area is not included in the object area like the item display screen 400 on the touch panel 70a, Touch-Move operation or the like to an area other than the object area is less likely to be determined to be surface contact, whereby the operability is increased. Further, when the user performs operation by actually holding the digital camera 100, it is highly likely that the digital camera 100 is tilted so that the display unit 28 is easily seen, than the case of holding it vertically on the ground with the inclination z of the digital camera 100 being 0. As such, as the inclination is larger, if an area not included in the prediction area where an unintentional touch operation is likely to be made is not included in the object area, it is possible to improve the operability of a touch operation having a large area such as Touch-Move in which a touch position moves a predetermined distance or more within a predetermined time. For example, even if a predetermined Touch-Move operation to a predetermined area included in the object area when the inclination z=0 is not acceptable, in the case of the inclination z=α in which the possibility that the user actually performs an operation is higher, a predetermined Touch-Move to the same predetermined area is acceptable.

As described above, by setting the position of the object area for detecting surface contact according to the inclination of the digital camera 100, surface contact can be detected with higher accuracy. Further, even by setting the size of the object area according to the prediction area, it is possible to detect surface contact with higher accuracy and further, to improve the operability of the touch operation.

[The Case of Setting a Threshold for Determining Surface Contact According to the Inclination of the Digital Camera 100]

The threshold areas in FIGS. 4B, 5B, and 6B show the sizes of thresholds when the thresholds are set according to the sizes of the prediction areas by the inclination. While in the present embodiment the size of each threshold is described as a half of the size of each prediction area, it may be changed according to the inclination of the digital camera 100 or the prediction area, rather than a half size thereof. Further, threshold areas 404, 504, and 604 are provided for showing the sizes of the thresholds, and the positions and the forms shown are examples.

While the prediction areas in FIG. 4A to FIG. 6D show ranges of areas having a high possibility of surface contact, the touch area when surface contact is made is likely to be smaller as the inclination is larger (touch area of an unintentional touch by a use is likely to be smaller as the size of the prediction area is smaller). As described above, the size of a touch area when an unintentional touch (surface contact) is made by a user is likely to be the size corresponding to the inclination of the digital camera 100.

For example, when the inclination z of the digital camera 100 is 0 as shown in FIGS. 4A to 4D, it is highly likely that an unintentional touch by a user may be made within a range shown as the prediction area 401. In the case of setting a threshold according to the size of the prediction area, the threshold is set to have a larger value (a half of the prediction area 401) when the inclination z=0 in FIG. 4A, compared with the case of setting the threshold according to the size of the threshold (a half of the prediction area 501) for detecting surface contact when the inclination z=α. As the threshold is set to be larger, the possibility that an unintentional touch by a user is detected as surface contact is reduced. As such, in the case of FIG. 4A, the possibility that even an intentional touch operation by the user is detected as surface contact is lowered when the threshold is set according to the size of the prediction area when the inclination z=0, compared with the case of setting the threshold according to the prediction area when the inclination z=α. Further, in the case where the inclination z of the digital camera 100 is α as shown in FIGS. 5A to 5D, the threshold becomes smaller if the threshold is set according to the prediction area when the inclination z=α, compared with the case where the threshold is set according to the prediction area when the inclination z=0. As such, if the inclination z=α and it is predicted that a touch area in the case of surface contact is smaller than that of the case of inclination z=0, by setting the threshold according to the prediction area, the possibility of detecting a touch operation, which is not intended by the user, as surface contact becomes higher.

Further, when the inclination z of the digital camera 100 is α as shown in FIGS. 5A to 5D, the size of the threshold becomes smaller if it is set according to the prediction area

501 (a half of the prediction area 501), than the case according to the prediction area 401 for the inclination z=0 (a half of the prediction area 401). Accordingly, when the inclination z=α, by setting the threshold according to the size of the prediction area 501, the possibility that a touch operation such as Touch-Move intended by the user is detected as surface contact is reduced, whereby the operability is improved.

Similarly, even in the case of FIGS. 6A to 6D, by setting the threshold according to the prediction area 601, the possibility that a touch operation intended by the user is detected as surface contact is reduced, whereby the operability is improved.

In this way, by setting the size of the threshold according to the size of the prediction area, it is possible to detect an unintentional touch by a user as surface contact regardless of the inclination of the digital camera 100, whereby the possibility of executing a function unintended by the user can be reduced.

[The Case of Changing an Object Area]

In FIGS. 4C and 4D, FIGS. 5C and 5D, FIGS. 6C and 6D, a threshold to be set is constant (as shown in a constant threshold area 405), which is different from FIG. 4B, FIG. 5B, and FIG. 6B.

FIG. 4C, FIG. 5C, and FIG. 6C show object areas in the case where a threshold is set to be constant regardless of the inclination of the digital camera 100. While description has been made that a threshold is set according to the size of a prediction area in FIG. 4B, FIG. 5B, and FIG. 6B, even if a threshold is constant, when an object area is set according to the inclination as described above, an unintentional touch by a user can be detected as surface contact with higher accuracy.

[The Case of Changing the Position of an Object Area Having a Certain Size According to the Inclination]

Figure 4D:
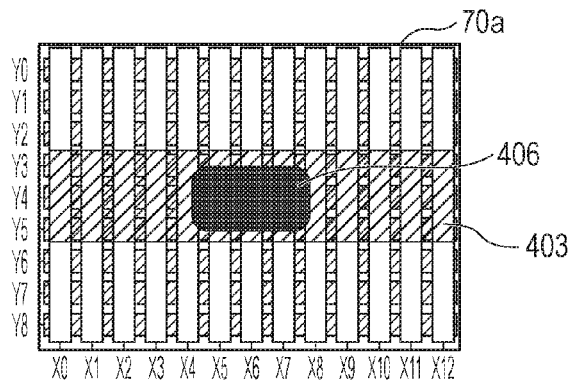

FIGS. 4D, 5D, and 6D show the cases where the size of a threshold and the size of an object area are constant regardless of the inclination as shown in a constant object area 403 and a constant threshold area 406, but the position where the object area is set differs depending on the inclination. It should be noted that in the present embodiment, as the range of an object area in the X axis direction is constant regardless of the inclination, description will be given on setting of a position of a range in the Y axis direction. However, the range in the X axis direction may also be set according to the inclination of the digital camera 100.

As shown in FIG. 4D, when the inclination z of the digital camera 100 is 0, the constant object area 403 is included in a range from Y1 to Y7 in the Y axis direction of the prediction area 401, and further, it is set at a position in a range from Y3 to Y5 located in the range from Y1 to Y7 or of the Y axis direction, or at the center of the Y axis direction of the display unit 28. The constant object area 403 is a position where it is predicted that an unintentional touch by a user is more likely to be made within the prediction area 401. If the inclination z of the digital camera 100 is α as shown in FIG. 5D, the constant object area 503 is set at a position in a range from Y5 to Y7 which is included in the range from Y5 to Y8 in the Y axis direction of the prediction area 501. The size of the range in the Y axis direction of the constant object area 503 and the size of the range in the Y axis direction of the constant object area 403 are the same, although the set positions thereof differ from each other. When the inclination z of the digital camera 100 is β as shown in FIG. 6D, the constant object area 603 is set at a position in a range from Y6 to Y8 included in a range from Y6 to Y8 in the Y axis direction of the prediction area 601.

If the size of the constant object area is smaller than the prediction area 601 as shown in FIG. 6D, it is only necessary to set the position of the object area so as to include a larger range of the prediction area. Further, the shape of the constant object area is not necessary in a range from X0 to X12 in the X axis direction. For example, in the case of FIG. 5D, when the range in the Y axis direction is from Y6 to Y7, it may be set in a range from X3 to X9, while when the range in the Y axis direction is from Y7 to Y8, it may be set in a range from X3 to X9.

In the case where the inclination z of the digital camera 100 is α as shown in FIGS. 5A to 5D, if an object area is set as the constant object area 403 for the case of the inclination z=0, a touch to a lower portion on the touch panel 70*a* (prediction area 501), where surface contact is more likely to be made, is not included in the touch area. As such, there is a possibility that surface contact is less likely to be detected. On the other hand, if an object area is set at a position where it overlaps the prediction area 501 as shown in the constant object area 503, a touch to an area where an unintentional touch by a user is likely to be made when the inclination z=α is included in the touch area, whereby surface contact is more likely to be detected. Even in the case where the inclination z of the digital camera 100 is β as shown in FIGS. 6A to 6D, by setting an object area at a position where it overlaps the prediction area 601 as shown in the constant object area 603, an unintentional touch by a user is more likely to be detected as surface contact.

In this way, by setting an object area at a position corresponding to the position of the prediction area, an unintentional touch by a user is more likely to be detected with higher accuracy.

As described above, by setting an object area for calculating a touch area at a position corresponding to the prediction area (range) as described in FIGS. 4A to 6D, an unintentional touch by a user (surface contact) is detectable with higher accuracy. Moreover, even by setting an object area according to the size of the prediction area, surface contact is detectable with higher accuracy, and further, the operability of a touch operation such as Touch-Move is improved.

Next, touch operation function execution processing will be described using FIGS. 7A and 7B. This processing is the details of the touch operation function execution processing performed at S321 of FIG. 3B. Further, this processing is realized by developing a program, stored in the non-volatile memory 56, in the system memory 52 and executing the program by the system control unit 50.

At S701, the system control unit 50 determines whether or not a touch operation is valid. From the touch operation information stored in the system memory 52 at S314 or S317 of FIG. 3B, it is determined whether the touch operation is invalid or valid. If it is determined that the touch operation is valid, the processing proceeds to S702, while, if not, the processing returns to S302 of FIG. 3A.

At S702, the system control unit 50 determines whether or not the touch operation detected at S311 of FIG. 3A is Touch-On. If it is determined to be Touch-On, the processing proceeds to S703, while, if not, the processing proceeds to S706.

At S703, the system control unit 50 determines whether or not it is Touch-On to an item on the item display screen. If it is determined that it is Touch-On to an item, the processing proceeds to S704, while, if not, the processing proceeds to S711.

At S704, the system control unit 50 determines whether or not Touch-Up is made from the touch panel 70*a*. If it is determined that Touch-Up is made, the processing proceeds to S705, while, if not, the processing returns to S702.

At S705, the system control unit 50 selects an item to which Touch-On is made (corresponding item) at S703. In the item display screen, when an item is selected, the screen is shifted to a screen for accepting a change to a set value of the selected item, and the user may change the set value of the item.

At S706, the system control unit 50 determines whether or not the touch operation detected at S311 of FIG. 3A is Touch-Move. If it is determined that the operation is Touch-Move, the processing proceeds to S707, while, if not, the processing proceeds to S711.

At S707, the system control unit 50 determines whether or not there is a function corresponding to Touch-Move. On the item selection screen, in the screen for changing a set value of a selected item (lower layer screen), the set value of the item can be changed according to the Touch-Move operation.

At S708, the system control unit 50 changes the set value according to the Touch-Move operation, as described above. The set value can be changed within a range of values which can be set, according to the direction and the distance of the Touch-Move operation.

At S709, the system control unit 50 determines whether or not Touch-Up is made from the touch panel 70a. If it is determined that Touch-Up is made, the processing proceeds to S710, while, if not, the processing returns to S706.

At S710, the system control unit 50 determines (sets) a set value when Touch-Up is made at S709.

At S711, the system control unit 50 does not execute a function, and proceeds to S302 of FIG. 3A. In this way, even when a touch operation is performed, if there is no function corresponding to the touch operation performed, no function is executed.

According to the embodiment described above, by setting an object area for determining surface contact according to the inclination of the digital camera 100 (touch panel 70a), surface contact which is not a touch operation intended by the user can be determined with higher accuracy. Further, in the set object area, a touch operation of the touch having a touch area equal to or greater than a threshold is determined to be invalid, and a function corresponding to the touch operation is not executed. As such, the possibility of executing a function not intended by the user is reduced. Further, if a touch area within the object area is less than a threshold, a function corresponding to the touch operation is executed, regardless of the touch area on an area other than the set object area being equal to or greater than the threshold or less than the threshold. This means that when a touch having a touch area equal to or greater than the threshold is performed, whether or not to execute a function corresponding to the touch differs, depending on whether or not the area is an area where an unintentional touch by a user is likely to be made (object area). As such, a function is executable easily according to a touch intended by a user, although a function is not easily executable according to an unintentional touch by a user. Further, by setting a threshold for determining whether or not a detected touch is an unintentional touch by a user according to a prediction area, it is possible to detect surface contact corresponding to the inclination of the digital camera 100 with hither accuracy, and in particular, when the inclination is larger, the operability such as Touch-Move is improved.

Figure 7A:
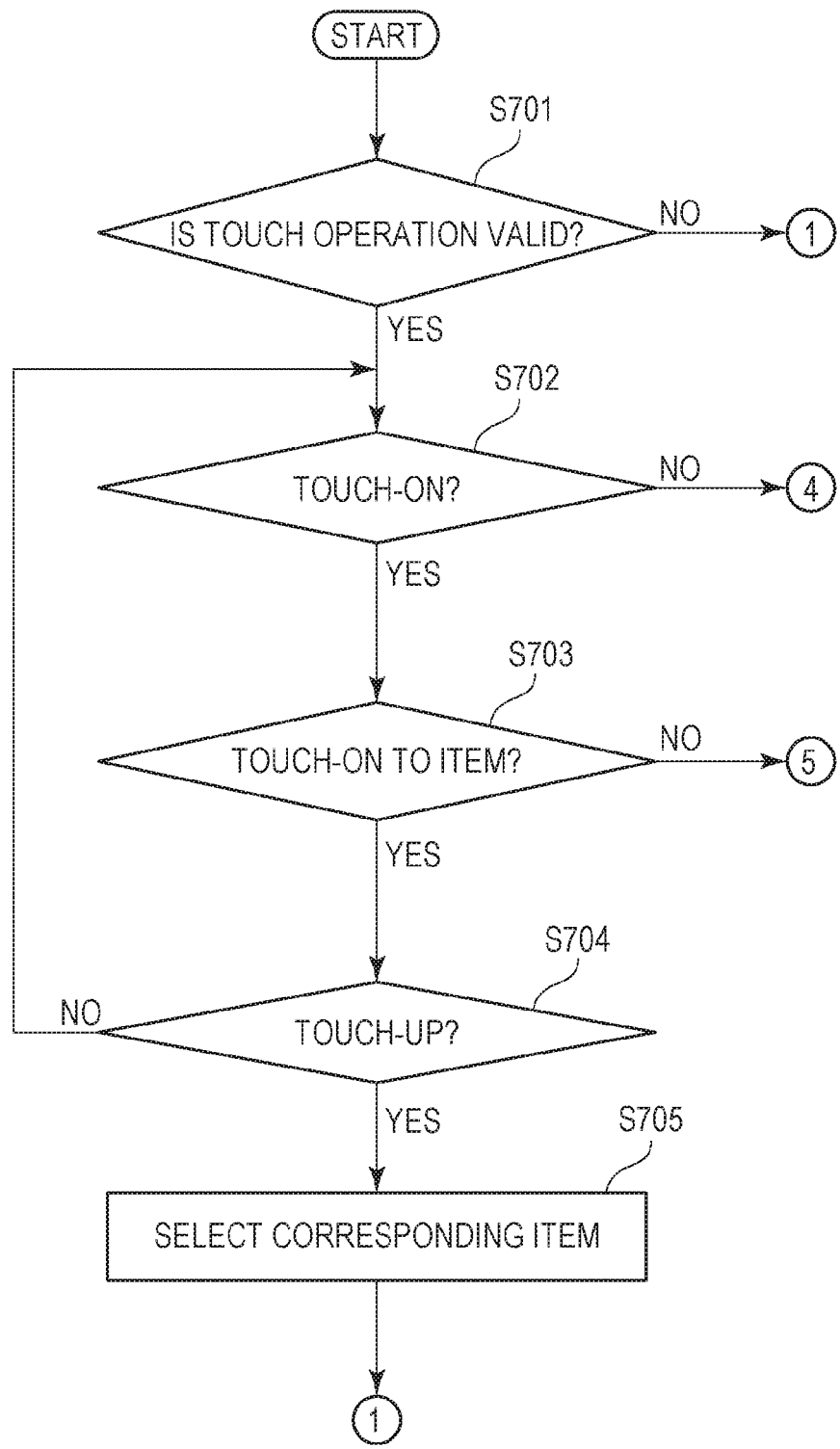
FIGS. 7A and 7B are flowcharts of touch operation function execution processing.
Figure 7B:
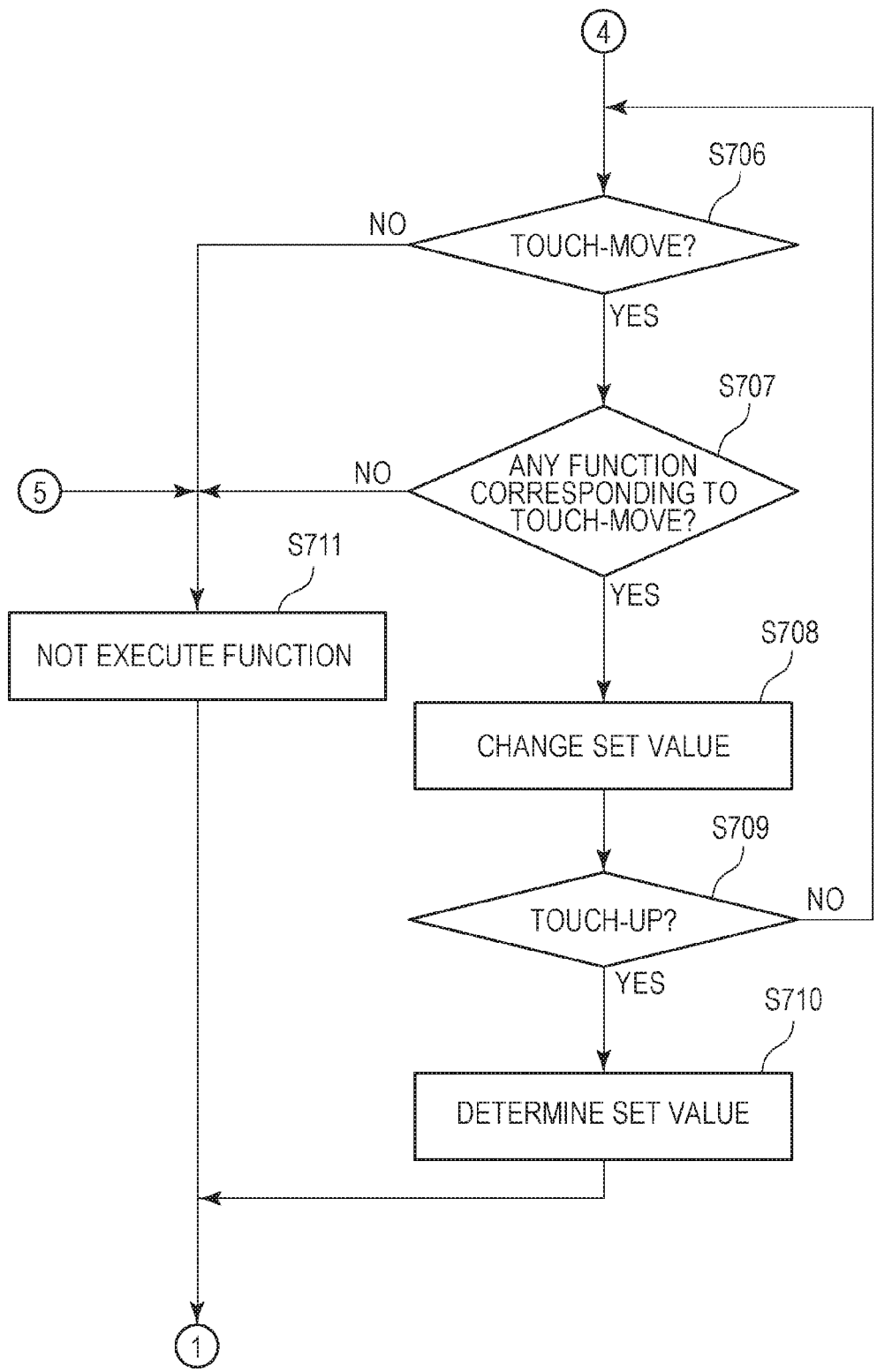

It should be noted that when a touch operation is determined to be invalid, it is not necessary to proceed to the processing of FIGS. 7A and 7B by invalidating the entire touch operation detected. Further, a touch performed before or after the touch detected as surface contact may also be determined to be invalid.

In the embodiment described above, while description has been made based on the premise that an object area is set according to the inclination detected by the posture detection unit 55, the present embodiment is not limited to this configuration and it may be set as described below. That is, an object area may be set according to the weight or the length of the lens unit 150 or the lens 103 mounted on the digital camera 100. In that case, an object area corresponding to lens information is stored in advance, and lens information of the mounted lens is acquired and the corresponding object area is set. Further, an object area may be changed according to the state of the length of the lens 103. This means that for a heavier lens, as the lens is longer, an object area is set to be located in a lower direction of the display unit 28.

Further, while it has been described that a prediction area is changed according to the inclination of the digital camera 100, an area where surface contact is likely to be made may be set according to user-specific inclination, because it may differ according to the way of holding by the user or the state thereof.

In the present embodiment, it has been described that the inclination becomes larger as the display direction of the display unit 28 faces a direction opposite to the gravity direction, and that an object area is set to an area on the gravity direction side of the touch panel 70a. However, the present embodiment may be applied to the case where the display direction of the display unit 28 faces the gravity direction. This means that an object area is set to an area on the side opposite to the gravity direction of the touch panel 70a, as the display direction of the display unit 28 faces the gravity direction. As such, when the strap portion 76 is on the side opposite to the gravity direction from the center of gravity of the digital camera 100 and the digital camera 100 is tilted by the gravity, an object area is set in the gravity direction of the touch panel 70a. Further, an object area may be set to an edge of the touch panel 70a in which the distance from the position of the center of gravity in a direction vertical to the gravity direction becomes larger before and after the inclination when the digital camera 100 is tilted.

Figure 8A:
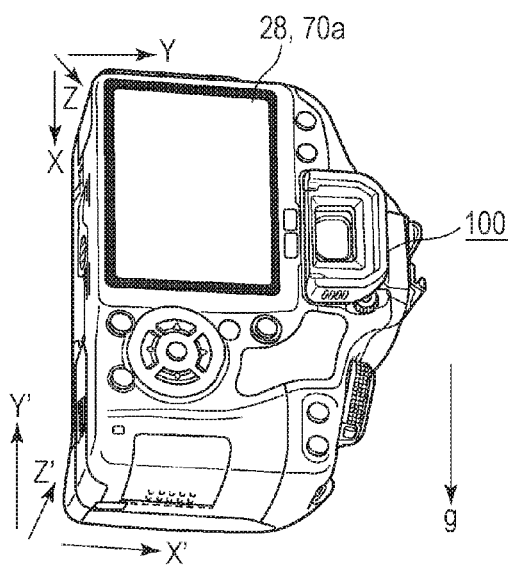
FIGS. 8A to 8C illustrate an orientation and an area of the device relating to touch detection.
Figure 8B:
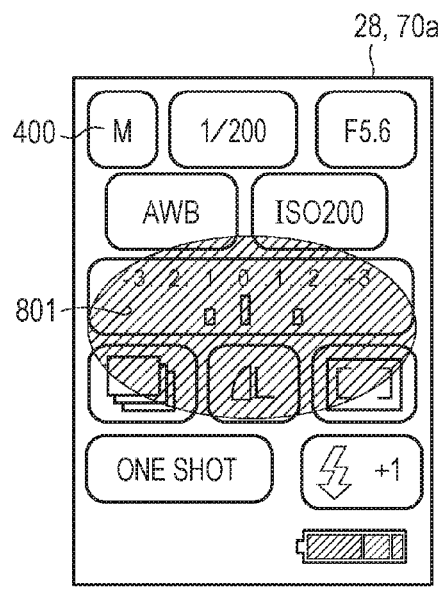
Figure 8C:
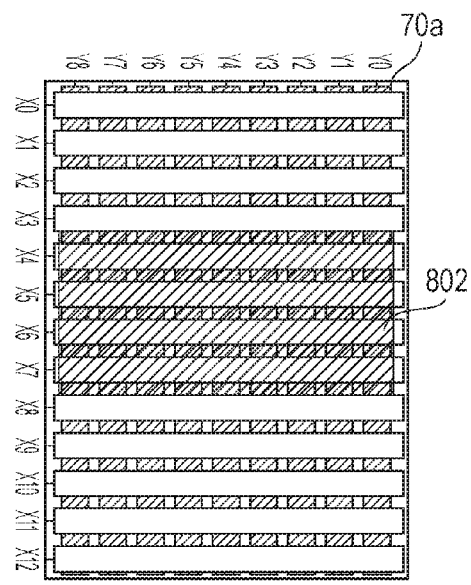

In the present embodiment, while it has been described that the inclination of the digital camera 100 (and the touch panel 70a) is detected by the inclination in the Z axis direction, it is also possible to use the inclination in the X axis direction or the Y axis direction as the inclination of the digital camera 100. An object area or a threshold may be set according to the size of the inclination in the reference direction of the X axis or the Y axis. FIGS. 8A to 8D show the case where the digital camera 100 is turned by 90 degrees on the X axis and the Y axis plane from the state shown in FIG. 4A. For example, when the orientation of the touch panel 70a is also turned by 90 degrees as shown in FIG. 8A, the touch panel 70a is turned to have an orientation as shown in FIG. 8B when seen from the user. As the orientation of the touch panel 70a is turned relative to the user holding the digital camera 100, an area such as a prediction area 801 becomes an area where an unintentional touch by a user is likely to be made. Further, when an inclination z'=0, a prediction area becomes an area like a prediction area 802 which is a center area in the Y' axis direction of the display unit 28 as shown in FIG. 8C. Further, even when the digital camera 100 is turned, the inclination of the digital camera 100 is detected at an angle of the display unit 28 relative to the gravity direction shown in FIG. 8A. In that case, as shown in FIG. 8C, the position for setting an object area according to the inclination of the digital camera 100 is changed along the X axis direction, rather than the Y axis direction of the touch panel 70a as in the case shown in FIGS. 4A to 6D.

Further, in the present embodiment, while it has been described that a touch area is calculated according to detection of a touch operation by the user, it is also possible to calculate a touch area by a certain time, and when the touch area becomes equal to or greater than a threshold, invalidate the touch operation in which the touch area is calculated. Further, it is also possible to invalidate a touch operation performed within a predetermined time before or after the operation in which the touch area becomes equal to or greater than a threshold.

In the present embodiment, while it has been described that a prediction area of the case where the inclination z of digital camera 100 is α or β is set to be an area of a half or one fourth of the touch panel 70a, the size of the prediction area is an example. As the size or shape of the prediction area vary depending on the inclination of the digital camera 100 or the angle or orientation of the digital camera 100 held by the user, an object area may be set according to the inclination or the prediction area.

It should be noted that if an item corresponding to a function to be executed according to a touch operation where a touch area is large is not displayed on the object area, an operation of a large touch area such as Touch-Move is performed outside the object area. Whereby, the operability is improved. Further, regarding a function to be executed according to an operation performed on the object area, it is possible not to allocate a function to be executed according to a touch operation using a large touch area. This means that a bar for changing a parameter according to the movement of a touch position on the bar is not displayed on the object area, and an icon in which a function is executed according to a touch of a small area such as a tap operation is displayed on the object area. In this way, by setting a function to be executed using a small touch area as a function to be executed according to a touch operation performed on the object area, it is possible to reduce the possibility that processing is performed unintentionally due to an unintentional touch by a user.

It should be noted that the digital camera may be controlled by a unit of hardware, or by a plurality of units of hardware which share processing to control the entire device.

While the present disclosure has been described in detail based on a preferred embodiment thereof, the present disclosure is not limited to such a particular embodiment. Various forms within a range not deviating from the scope of the present disclosure are also included in the present disclosure. Further, the embodiment described above merely shows an exemplary embodiment of the present disclosure, and embodiments may be combined appropriately.

Further, while the above embodiment has been described based on the case of applying the present disclosure to a digital camera as an example, the present disclosure is not limited to this example. The present disclosure is applicable to an electronic device capable of detecting a touch operation. As such, the present disclosure is applicable to a mobile phone terminal, or an image viewer, a digital photo frame, a music player, a game console, or an electronic book reader, of a portable type.

(Other Embodiments)

The present disclosure can also be realized by executing the following processing. That is, software (program) for realizing the function of the above-described embodiment is supplied to a system or a device via a network or various recording media, and a computer (or CPU (central processing unit), MPU (micro processing unit), or the like) of the system or the device reads the program code and executes it. In that case, the program or a recording medium storing the program constitutes the present disclosure.

According to the present disclosure, malfunctions due to unintentional touches by a user can be reduced.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2015-098487, filed May 13, 2015, which is hereby incorporated by reference herein in its entirety.

What is claimed is:

1. An electronic device comprising:
a posture detection unit configured to detect a posture of the electronic device;
a touch detection unit configured to detect a touch on a touch panel;
a function execution unit configured not to execute a function according to a touch when a touch area on an object area of the touch panel is equal to or greater than a threshold, while, to execute a function according to the touch when the touch area on the object area is less than the threshold, regardless of a touch area on an area other than the object area being less than or equal to or greater than the threshold; and
a control unit configured to control the object area of the touch panel to be made different according to the posture detected by the posture detection unit,
wherein when the posture detection unit detects that a posture of the touch panel is a first posture, the control unit performs control to set a first area of the touch panel to be the object area, while when the posture detection unit detects that the posture is a second posture having a larger inclination by a predetermined value than an inclination of the first posture, the control unit performs control to set a second area, which is different from the first area to be the object area.

2. The electronic device according to claim 1, wherein the first area and the second area locate at different positions on the touch panel.

3. The electronic device according to claim 1, wherein size of the first area and size of the second area are different.

4. The electronic device according to claim 1, wherein the control unit performs control to set the threshold of the touch area according to the posture detected by the posture detection unit.

5. The electronic device according to claim 1, wherein the posture detection unit is able to detect an inclination of the electronic device relative to a gravity direction.

6. The electronic device according to claim 1, wherein when the electronic device is tilted in a direction that a display direction of a display unit, on which the touch panel is superimposed, faces a gravity direction, the second posture is a posture in which an inclination of a touch surface of the touch panel relative to the gravity direction is larger than an inclination of the first posture, and the second area is an area on a side of the gravity direction from the first area on the touch panel.

7. The electronic device according to claim 1, wherein the second posture is a posture in which an inclination of a touch surface of the touch panel relative to a gravity direction is larger than an inclination of the first posture, and size of the second area is smaller than size of the first area.

8. The electronic device according to claim 1, wherein the second posture is a posture in which an inclination of a touch surface of the touch panel relative to a gravity direction is larger than an inclination of the first posture, and a value of a threshold of the touch area in a case of the second posture is smaller than a value of a threshold of the touch area in a case of the first posture.

9. The electronic device according to claim 1, wherein the control unit controls the function execution unit not to execute a function according to a touch operation on the touch panel regardless of a size of the touch area, in a case where a fact that the touch area on the object area is equal to or greater than the threshold is detected predetermined number of times or more.

10. The electronic device according to claim 1, wherein the touch area is a sum of touch areas touched on the object area within a predetermined time.

11. The electronic device according to claim 1, wherein the touch panel is of an electrostatic capacitive type.

12. The electronic device according to claim 1, wherein the electronic device is a digital camera having an imaging unit.

13. The electronic device according to claim 12, wherein the control unit is able to set the object area based on information regarding a lens to be mounted on the electronic device.

14. The electronic device according to claim 1, wherein the electronic device includes a strap portion to which a strap is attachable.

15. The electronic device according to claim 1, wherein in a case where a first function is executed according to a movement of a touch position on a first item, and a second function is executed according to a touch on a second item,
the control unit performs control to display the first item in an area other than the object area and display the second item in the object area.

16. A method of controlling an electronic device, the method comprising:
a posture detection step of detecting a posture of the electronic device;
a touch detection step of detecting a touch on a touch panel;
a function execution step of not executing a function according to a touch when a touch area on an object area of the touch panel is equal to or greater than a threshold, while, executing a function according to the touch when the touch area on the object area is less than the threshold, regardless of a touch area on an area other than the object area being less than or equal to or greater than a threshold; and
a control step of controlling the object area of the touch panel to be made different according to the posture detected in the posture detection step,
wherein when the posture detection step detects that a posture of the touch panel is a first posture, the control step performs control to set a first area of the touch panel to be the object area, while when the posture detection step detects that the posture is a second posture having a larger inclination ,by a predetermined value than an inclination of the first posture, the control step performs control to set a second area, which is different from the first area, to be the object area.

17. A non-transitory computer readable storage medium storing a program for executing a method of controlling an electronic device, the method comprising:
a posture detection step of detecting a posture of the electronic device;
a touch detection step of detecting a touch on a touch panel;
a function execution step of not executing a function according to a touch when a touch area on an object area of the touch panel is equal to or greater than a threshold, while, executing a function according to the touch when the touch area on the object area is less than the threshold, regardless of a touch area on an area other than the object area being less than or equal to or greater than a threshold; and
a control step of controlling the object area of the touch panel to be made different according to the posture detected in the posture detection step,
wherein when the posture detection step detects that a posture of the touch panel is a first posture, the control step performs control to set a first area of the touch panel to be the object area, while when the posture detection step detects that the posture is a second posture having a larger inclination by a predetermined value than an inclination of the first posture, the control step performs control to set a second area, which is different from the first area, to be the object area.

* * * * *